(12) United States Patent
Akiyama

(10) Patent No.: US 7,185,984 B2
(45) Date of Patent: Mar. 6, 2007

(54) ILLUMINATION OPTICAL SYSTEM AND PROJECTOR COMPRISING THE SAME

(75) Inventor: Koichi Akiyama, Suwa (JP)

(73) Assignee: Seiko Epson Corporation, Tokyo (JP)

(*) Notice: Subject to any disclaimer, the term of this patent is extended or adjusted under 35 U.S.C. 154(b) by 1222 days.

(21) Appl. No.: 09/897,287

(22) Filed: Jul. 2, 2001

(65) Prior Publication Data
US 2006/0176450 A1    Aug. 10, 2006

(30) Foreign Application Priority Data
Jul. 5, 2000    (JP)    ............................. 2000-203411

(51) Int. Cl.
G03B 21/00    (2006.01)
G03B 21/14    (2006.01)

(52) U.S. Cl. .............................. 353/20; 353/31; 353/97

(58) Field of Classification Search ................. 353/20, 353/31, 34, 37, 38, 97; 349/5, 7–9; 359/619–622, 359/627, 629
See application file for complete search history.

(56) References Cited

U.S. PATENT DOCUMENTS

| 5,379,083 | A | | 1/1995 | Tomita |
|---|---|---|---|---|
| 6,067,193 | A | * | 5/2000 | Sekine et al. ................ 359/489 |
| 6,084,714 | A | | 7/2000 | Ushiyama et al. |
| 6,283,599 | B1 | | 9/2001 | Lin |
| 6,394,607 | B1 | | 5/2002 | Hashizume et al. |
| 6,464,362 | B1 | * | 10/2002 | Sugawara et al. ........... 353/102 |
| 6,497,485 | B1 | | 12/2002 | Itoh |
| 6,540,380 | B2 | * | 4/2003 | Wang ......................... 362/293 |

FOREIGN PATENT DOCUMENTS

| DE | 19838559 A1 | 3/1999 |
|---|---|---|
| EP | 0980188 A2 | 2/2000 |
| GB | 2213275 A | 8/1989 |
| JP | 60-53917 | 3/1985 |
| JP | 5-303085 | 11/1993 |
| JP | 10-111472 | 4/1998 |
| JP | 10-170869 | 6/1998 |
| JP | 10-221690 | 8/1998 |
| JP | 11-064850 | 3/1999 |
| JP | 11-338053 | 12/1999 |
| JP | 2000-029138 | 1/2000 |
| JP | 2000-347137 | 12/2000 |
| JP | 2001-228569 | 8/2001 |
| WO | WO 99/56099 | 11/1999 |

* cited by examiner

*Primary Examiner*—Rodney Fuller
(74) *Attorney, Agent, or Firm*—Muramatsu & Associates

(57) ABSTRACT

Brightness of optical equipment can be adjusted as required. An illumination optical system includes a light source, a lens array composed of a plurality of lenses for splitting light emitted from the light source into a plurality of sub-beams, and a polarization conversion element for adjusting the light polarization directions. The illumination optical system further includes a light shielding member between the lens array and the polarization conversion element to adjust the quantity of incident light on polarization splitting films provided in the polarization conversion element.

15 Claims, 9 Drawing Sheets

ILLUMINATION OPTICAL SYSTEM AND PROJECTOR COMPRISING THE SAME

BACKGROUND OF THE INVENTION

1. Field of the Invention

The present invention relates to an illumination optical system and a projector provided with the same.

2. Description of the Related Art

FIG. 11 is a perspective view showing the appearance of a typical projector. Here, a rectangular parallelepiped projector 501 includes an upper case 503 which defines the upper surface thereof and is provided with operating buttons 502 disposed thereon, a lower case 504 which defines the lower surface of the projector 501 and a front case 505 which defines the front surface of the projector 501. There is a projection lens 506, the front end portion of which protrudes from the front case 505.

A known optical system in such a projector is constituted, for example, as shown in FIG. 12.

That is, the projector is provided with an illumination optical system 520 for making an illumination distribution of light from a light source 510 uniform and making the light incident on liquid crystal panels 550R, 550G, 550B with the light having the same polarization. The projector also includes a color beam splitting optical system 530 for splitting a beam W emitted from the illumination optical system 520 into red, green, and blue beams R, G, B, respectively, and a relay optical system 540 for guiding the blue beam B out of the beams split by the color beam splitting optical system 530 to the liquid crystal panel 550B associated with the blue beam B. The projector further includes the three liquid crystal panels 550R, 550G, 550B as light modulating means for modulating the respective color beams according to given image information, a cross dichroic prism 560 as a color beam synthesizing optical system for synthesizing the modulated respective color beams and a projection lens 506 for expanding and projecting the synthesized beams on a projection screen.

As shown in a schematic view of FIG. 13 showing an action of the illumination optical system, in the illumination optical system 520, light emitted from the light source 510 is split by a first lens array 521 into a plurality of sub-beams and made incident on a polarization conversion element array 523 via a second lens array 522. Then, the polarization conversion element array 523 is allowed to provide the respective sub-beams with the same polarization. Thereafter, the sub-beams are superimposed on the image forming area of the liquid crystal panels 550R, 550G, 550B by a superimposing lens 524.

By this action, the illumination optical system 520 uniformly illuminates the respective liquid crystal panels 550R, 550G, 550B by one type of polarized light and brightens all over the projection screen when an image is displayed by a projector or the like, thereby contributing to provision of a sharp high contrast all over the image.

However, when an image is projected in a size smaller than preset size by utilizing such a device having higher brightness, unnecessarily excessive light is projected on a projection screen so that the image becomes too glaring to see. It is considered that a projection lens is provided with a variable diaphragm as means for solving this problem. As a result, however, design freedom of the projection lens is significantly limited, that is, the size of the projection lens is increased and the types thereof are limited and so on.

SUMMARY OF THE INVENTION

The object of the present invention is thus to provide an illumination optical system capable of maintaining higher brightness of optical equipment and adjusting the brightness as required without degrading design freedom of other optical systems such as a projection optical system and a projector provided with the same.

An illumination optical system comprising: a light source; a beam splitting element including a plurality of lenses that splits light emitted from the light source into a plurality of sub-beams; a polarization conversion element including a polarization beam splitter array that splits each of the plurality of sub-beams into two types of polarized light, the polarization beam splitter array having a plurality of polarization splitting films and reflective films which are alternately arranged, and a phase element disposed on the emitting surface side of the polarization beam splitter array to align the light polarization directions of the two types of polarized light; and a light shielding member that adjusts a quantity of incident light on the polarization splitting films, the light shielding member being provided between the beam splitting element and the polarization beam splitter array. Consequently, the quantity of the incident light on an object to be illuminated can be adjusted without limiting design freedom of other optical systems such as a projection optical system. In addition, appropriate adjustment of the quantity of the incident light contributes to a longer life of equipment to be illuminated such as an electro-optical device illuminated by this illumination optical system.

The light shielding member may be a light shielding plate provided with a plurality of light shielding portions and apertures corresponding to the polarization splitting films and reflective films and is movably disposed along the polarization conversion element. Also, the light shielding member may be constituted by a plurality of parallel light shielding plates to adjust the quantity of the incident light by moving any ones thereof. By using these members, the quantity of the incident light can be easily adjusted. In the above case, when a plurality of light shielding plates are disposed corresponding to the plurality of polarization splitting films, respectively, the quantity of the incident light can be adjusted for each polarization splitting film, thereby improving precision of the adjustment.

The light shielding member may be a variable diaphragm which arbitrarily reduces the quantity of the incident light on the polarization splitting films constituting the polarization conversion element. In this case, light transmitting portions of the variable diaphragm are formed as slits and the quantity of the incident light on the polarization splitting films can be reduced by changing widths of the slits.

This variable diaphragm can also adjust a quantity of incident light on an object to be illuminated without limiting design freedom of other optical systems such as a projection optical system, thereby contributing to a longer life of equipment to be illuminated such as an electro-optical device illuminated by this illumination optical system.

The light shielding member is preferably composed of metallic material having an optical reflectance of 80% or more. Since heat absorption in the light shielding member is retarded by using such a material, a light shielding member or diaphragm having excellent heat resistance can be obtained even under high brightness conditions.

Meanwhile, a projector of the present invention is comprised of the illumination optical system as described above and an electra-optical device that modulates the light emitted by the illumination optical system.

This projector may be further comprised of a color beam splitting optical system for splitting the light emitted by the illumination optical system into beams of three colors, a plurality of the electro-optical devices for modulating each of the color beams split by the color beam splitting optical system, a color beam synthesizing optical system for synthesizing modulated beams of each color, and a projection lens for projecting the synthesized beams.

Effects of the above-described illumination optical system are specifically demonstrated in this projector.

DESCRIPTION OF PREFERRED EMBODIMENTS

Now, embodiments of the present invention will be explained below by way of example. In the following explanations, the traveling direction of the light is defined as a z-direction, the direction of 12 o'clock with respect to the z-direction is defined as a ydirection, and the direction of 3 o'clock with respect to the z-direction is defined as an x-direction, unless otherwise specified.

Figure 1:
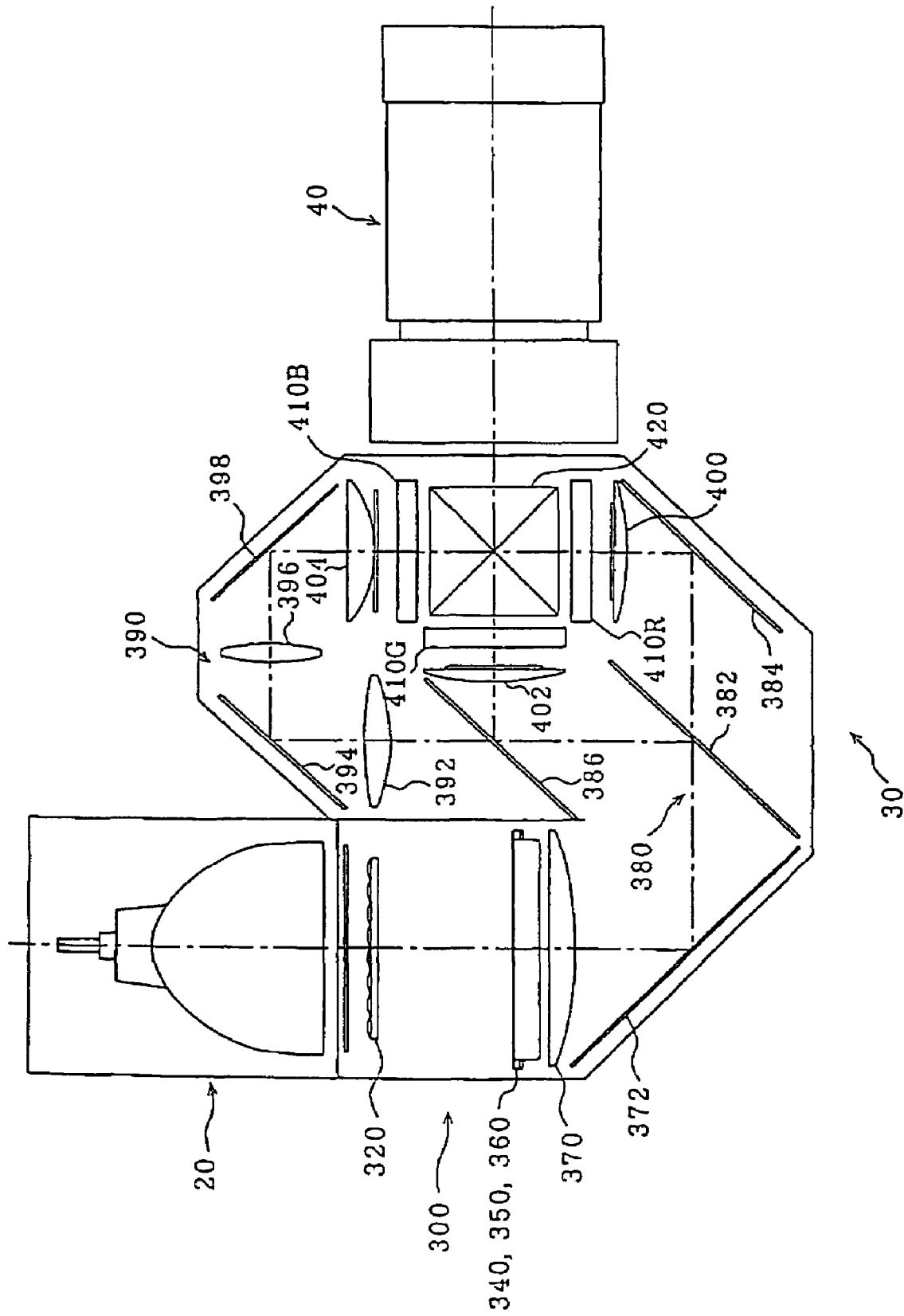
FIG. 1 is a plan view showing an optical system of a projector according to an embodiment of the present invention.

FIG. 1 is a schematic plan view showing the configuration of an illumination optical system incorporated into a projector according to an embodiment of the present invention. The optical system includes three main portions: a light source unit 20, an optical unit 30, and a projection lens 40. The optical unit 30 is provided with an integrator optical system 300 described later, a color beam splitting optical system 380 having dichroic mirrors 382, 386 and a reflective mirror 384, a relay optical system 390 having an incident lens 392, a relay lens 396 and reflective mirrors 394, 398. The optical unit 30 is further provided with three field lenses 400, 402, 404, three liquid crystal panels (of the type of a liquid crystal light valve) 410R, 410G, 410B and a cross dichroic prism 420, which is a color beam synthesizing optical system.

The light source unit 20 is disposed on the incident side of a first lens array 320 of the optical unit 30. The projection lens 40 is disposed on the emission side of the cross dichroic prism 420 of the optical unit 30.

Figure 2:
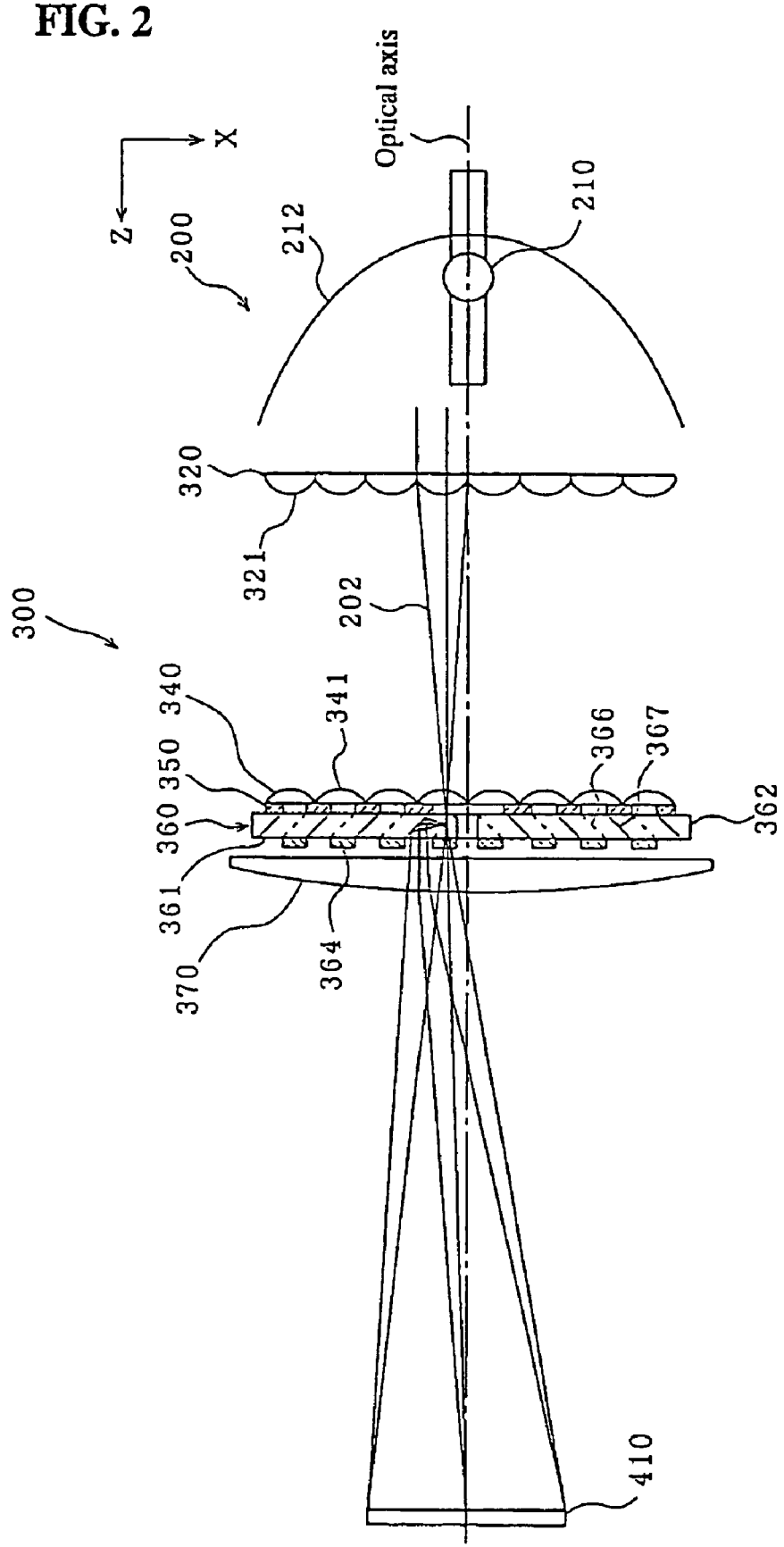
FIG. 2 is an explanatory view of an illumination optical system constituting the optical system in FIG. 1.

FIG. 2 is an explanatory view showing an illumination optical system for illuminating the three liquid crystal panels, which are the illuminated areas in the projector shown in FIG. 1. This illumination optical system is comprised of a light source 200 provided in the light source unit 20 and an integrator optical system 300 provided in the optical unit 30. The integrator optical system 300 has the first lens array 320, a second lens array 340, a light shielding plate 350 and a polarization conversion element array 360 to be described later, and a superposing lens 370.

To simplify the explanation, FIG. 2 shows only main components for explaining functions of the illumination optical system.

The light source 200 is provided with a light source lamp 210 and a concave mirror 212. Radial beams emitted from the light source lamp 210 are reflected by the concave mirror 212 and emitted in the direction toward the first lens array 320 as a bundle of substantially parallel light.

Here, a halogen lamp, a metal halide lamp or a high pressure mercury lamp can be used as the light source lamp 210. A parabolic mirror is preferably used as the concave mirror 212.

Figure 3:
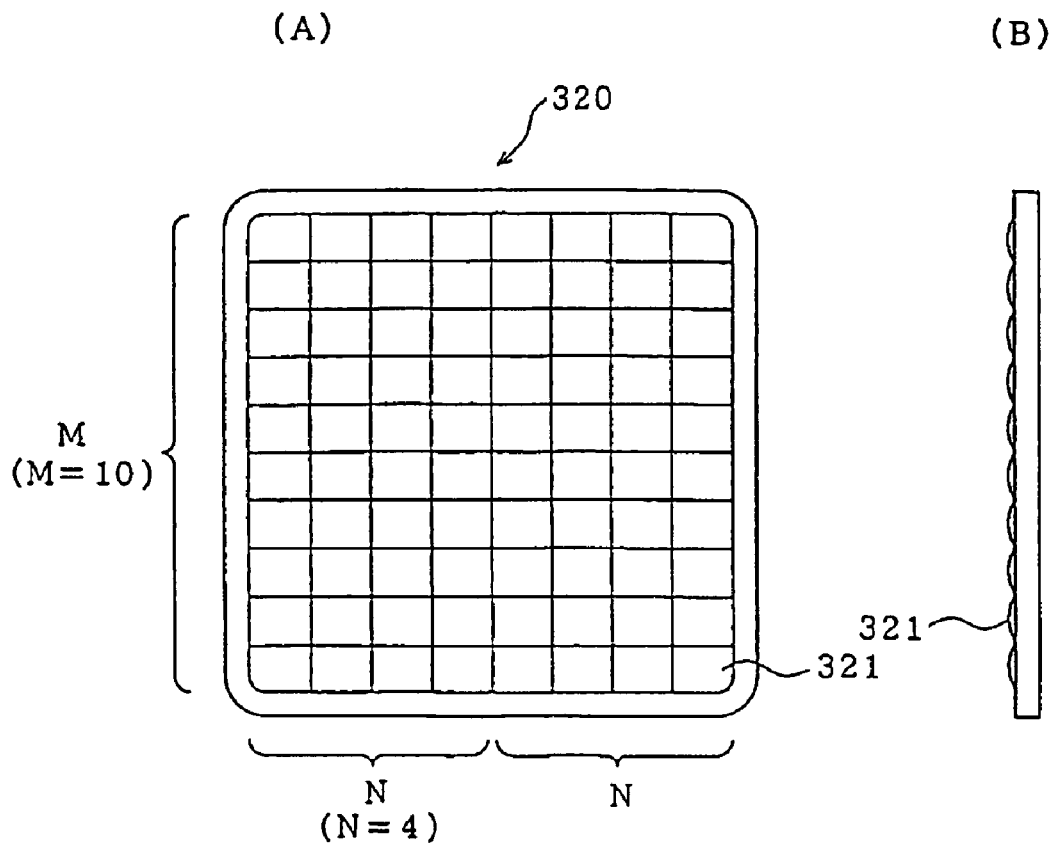
FIG. 3(A) is a front view and FIG. 3(B) is a side view of a first lens array constituting the illumination optical system.

FIG. 3(A) is a front view and FIG. 3(B) is a side view showing the appearance of the first lens array 320. This first lens array 320 is constituted by an array of small lenses 321 each having a rectangular contour, in a matrix of N×2 columns in the vertical direction (here, N =4) and M rows (here, M =10) in the horizontal direction. The external shape of each small lens 321 viewed from the z-direction is set to be almost similar to that of each of the liquid crystal panels 410R, 410G, 410B. For example, if an aspect ratio (i.e., the ratio of a horizontal to vertical dimension) of the image forming area of a liquid crystal panel is 4:3, the aspect ratio of each small lens 321 is also set to the ratio of 4:3.

The second lens array 340 has a function of guiding each of a plurality of sub-beams emitted from the first lens array 320 so as to be converged onto each of polarization splitting films 366 of two polarization conversion element arrays 361, 362. The second lens array 340 is constituted by a plurality of small lenses 341. The number of small lenses 341 is the same as that of the small lenses 321 constituting the first lens array 320. The direction of lenses of the first lens array 320 and second lens array 340 may be either the +z direction or −z direction or these arrays may face in the directions different from each other as shown in FIG. 2.

Figure 4:
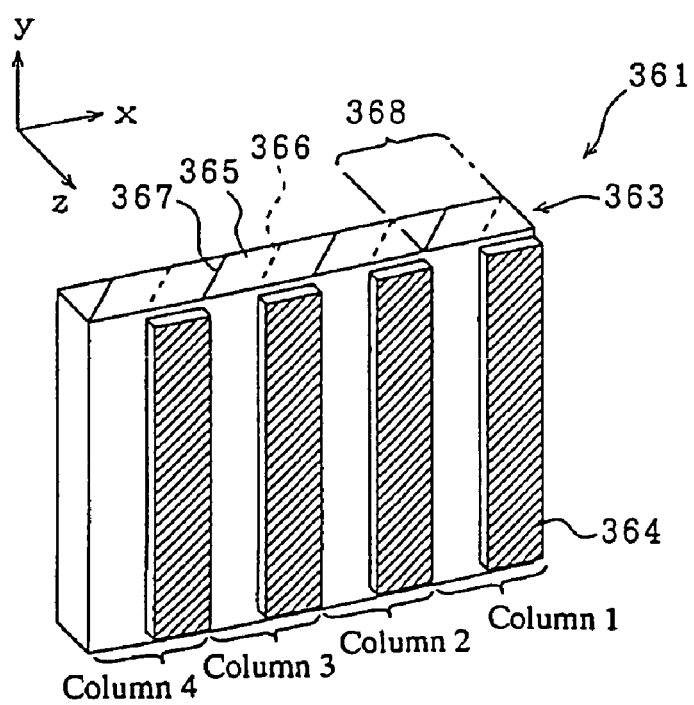
FIG. 4 is a perspective view showing the appearance of a polarization conversion element array.

In the polarization conversion element array 360, two polarization conversion element arrays 361, 362 are disposed in directions symmetrical with respect to the optical axis as shown in FIG. 2. FIG. 4 is a perspective view showing the appearance of one polarization conversion element array 361. The polarization conversion element array 361 is provided with a polarization beam splitter array 363 composed of a plurality of polarized beam splitters and λ/2 phase plates 364 (λ is a wavelength of light) selectively disposed on part of the light emitting surface of the polarization beam splitter array 363. The polarization beam splitter array 363 is formed by successively stacking a plurality of pillar-shaped parallelogram light transmissive members 365. Polarization splitting films 366 and reflective films 367 are alternately formed at the boundaries of the light transmissive members 365. The λ/2 phase plates 364 are selectively laminated on mapping portion in the x direction of the light emitting surface of the polarization splitting films 366 or the reflective films 367. In this example, the λ/2 phase plates 364 are laminated on mapping portion in the x direction of the light emitting surface of the polarization splitting film 366.

Figure 5:
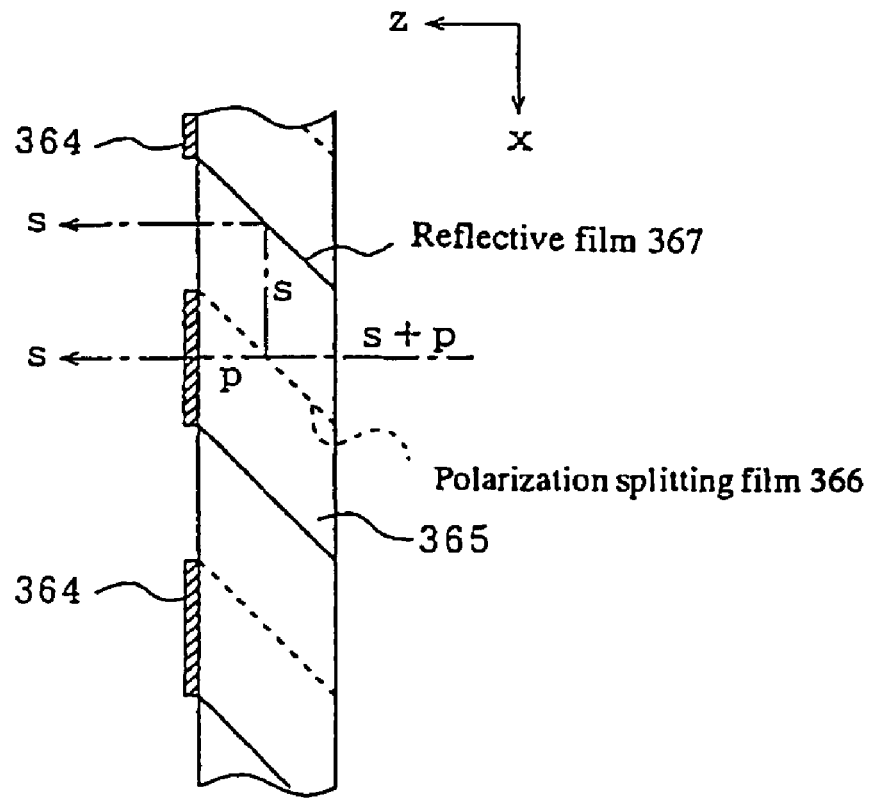
FIG. 5 is a schematic view showing an action of the polarization conversion element array.

The polarization conversion element array 361 has a function of converting incident beams into one type of linearly polarized beams. FIG. 5 is a schematic view showing the action of the polarization conversion element array 361. When a non-polarized beam (i.e. a beam having a random polarization) including s-polarized and p-polarized components is made incident upon the incident surface of the polarization conversion element array 361, this incident beam is first split into an s-polarized beam and a p-polarized beam by the polarization splitting film 366. The s-polarized beam is almost perpendicularly reflected on the polarization splitting film 366 and further reflected on the reflective film 367. On the other hand, the p-polarized beam is allowed to be transmitted through the polarization splitting film 366 remaining unchanged. A λ/2 phase plate 364 is disposed on the emitting surface of the p-polarized beam transmitted through the polarization splitting film 366 and this p-polarized beam is converted to an s-polarized beam and then emitted. Therefore, most of the light transmitted through the polarization conversion element array 361 is emitted as an s-polarized beam. It is noted that, if the light emitted from the polarization conversion element array 361 needs to be a p-polarized beam, the λ/2 phase plate 364 may be disposed on the emitting surface from which the s-polarized beam reflected by the reflective film 367 is emitted. As long as the same polarization can be provided, a quarter-wave plates may be used. Alternatively, desired phase plates may be provided on the emitting surfaces of both the p-polarized beam and s-polarized beam.

In the above polarization conversion element array 361, one block constituted by one polarization splitting film 366 and one reflective film 367 which are adjacent to each other and further a λ/2 phase plate 364 can be assumed as one polarization conversion element 368. The polarization conversion element array 361 is obtained by arraying a plurality of such polarization conversion elements 368 in the x direction. Since the polarization conversion element array 362 has exactly the same configuration as that of the polarization conversion element array 361, explanation thereof is omitted.

Figure 6:
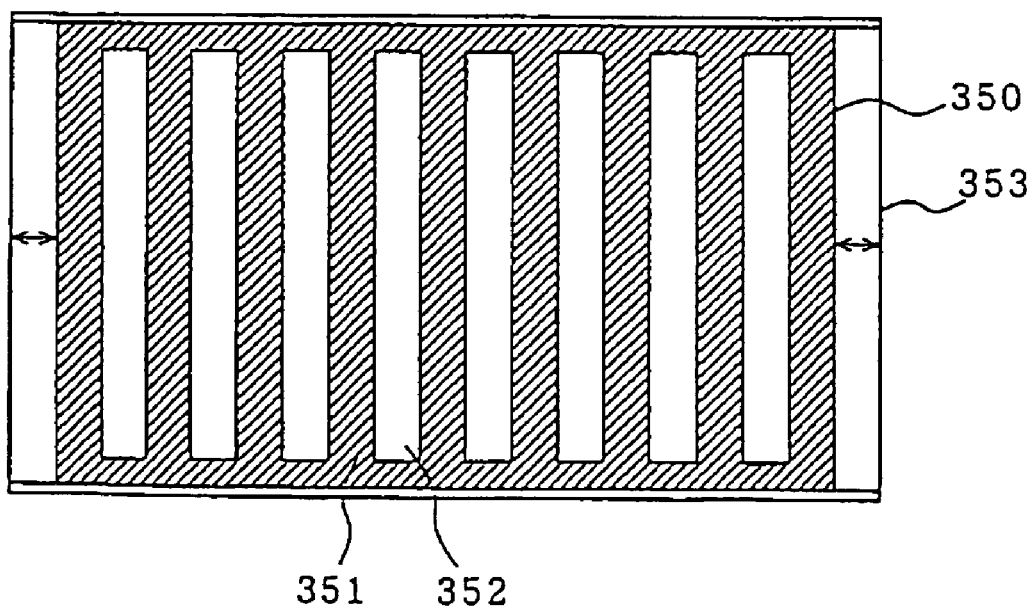
FIG. 6 is a front view showing an example of a light shielding plate for adjusting a quantity of incident light on polarization splitting films.

A light shielding plate 350 as a light shielding member will be described below. FIG. 6 is a front view showing an example of a light shielding plate for adjusting a quantity of incident light on the polarization splitting films 366. This light shielding plate 350 is a plate-like body obtained by alternately forming light shielding portions 351 for shielding light and apertures 352 for transmitting light corresponding to the light incident surfaces of the respective transparent members 365 constituting a polarization conversion element array 360 (361, 362), each of the light shielding portions having about the same width as that of the light incident surface of each light transmissive member 365. This light shielding plate 350 is held by a guide 353 and is constructed movably along the arraying direction of the polarization splitting films 366 and reflective films 367 (arrow direction in FIG. 6) by combining with an existing drive mechanism.

This light shielding plate 350 is disposed between the second lens array 340 and polarization conversion element array 360. The light shielding portions 351 and apertures 352 are normally positioned so that light is made incident only on the light incident surfaces corresponding to the polarization splitting films 366 out of light incident surfaces of two polarization conversion element arrays 361, 362. In this case, maximum brightness of the illumination optical system can be obtained.

On the other hand, if the brightness is too high in the above normal state, the light shielding plate 350 is slightly moved and part of the light made incident on the light incident surfaces of the light transmissive members 365 corresponding to the polarization splitting films 366 is shielded by the light shielding portions 351. Thus, the quantity of the incident light is appropriately adjusted.

Since the polarization conversion element array 360 is in the vicinity of the arc image of the light source, the vicinity of the polarization conversion element array 360 and the entrance pupil of the projection lens are almost conjugated. Therefore, shielding of light by the light shielding plate 350 or the like at this position has the same effect as that of light reduction by the diaphragm of the projection lens and thereby brightness can be adjusted without causing uneven illumination.

Figure 7:
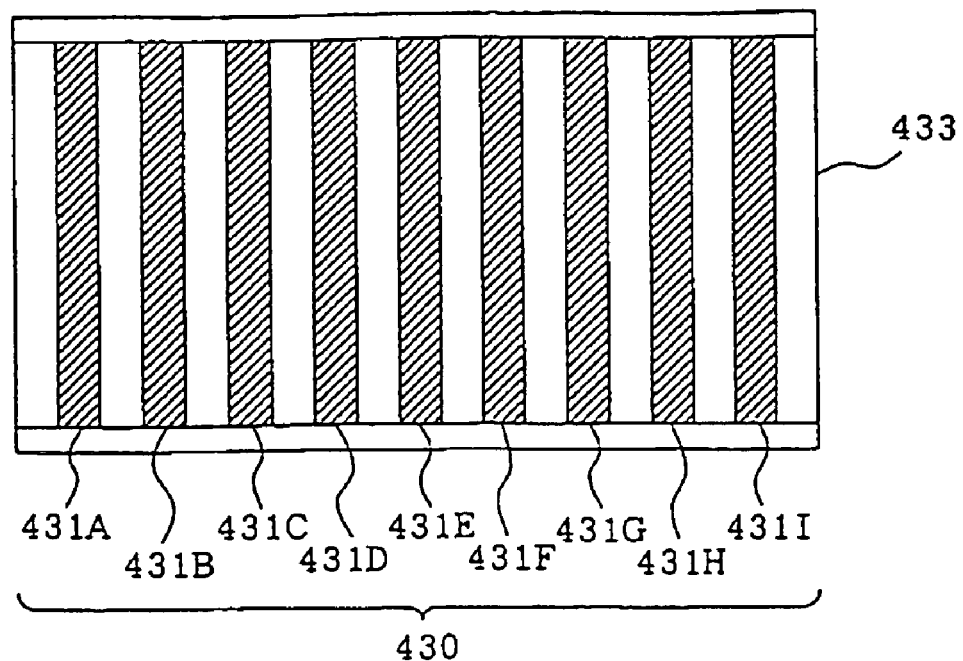
FIG. 7 is a front view showing another example of a light shielding plate for adjusting the quantity of incident light on the polarization splitting films.

FIG. 7 is a front view showing a construction of another light shielding plate 430 for achieving the same object as that of the light shielding plate 350. The above-described light shielding plate 350 is obtained by integrally forming the respective light shielding portions 351. On the other hand, in this light shielding plate 430, portions corresponding to the aforementioned respective light shielding portions 351 are constituted by independent light shielding portions 431A–431I. The light shielding portions 431A–431I are movably held by a guide 433 with a gap corresponding to the incident surface width of each light transmissive member 365. The independent light shielding portions 431A–431I can be moved by an existing drive mechanism. The independent light shielding portions 431A–431I are constituted so as to be independently movable along a direction in which a plurality of polarization conversion elements constituting the polarization conversion element array 360 are stacked (i.e. a direction of arrangement of adjacent independent light shielding portions 431A–431I).

In this light shielding plate 430 as well, normally, the independent light shielding portions 431A–431I are positioned so that light is made incident only on the light incident surfaces corresponding to the polarization splitting films 366 out of the light incident surfaces of two polarization conversion element arrays 361, 362. Then, when adjustment of brightness is required, all of the independent light shielding portions 431A–431I or only required ones are moved slightly depending on the situation so that the quantity of incident light on the polarization splitting films 366 can be adjusted. Thus, precision in adjustment of brightness can be improved.

Using two light shielding plates 350 or 430, or one light shielding plate 350 in combination with one light shielding plate 430, one light shielding plate may be fixedly positioned so that light is made incident only on the light incident surfaces corresponding to polarization splitting films 366 and the other light shielding plate (including the light shielding portions 431A–431I about the plate 430) disposed in parallel thereto may be moved to adjust the quantity of incident light on the polarization splitting films 366. As a result, there is an advantage that incident light on the reflective films 367 in the polarization conversion element array 360 can be completely blocked. Three or more of shielding plates 350 or 430, or the combination of three or more shielding plates 350 and 430 also can be used.

An action of the illumination optical system incorporating the light shielding plate will be described below. Since both the light shielding plates 350, 430 have the same basic actions of a light shielding plate, description will be given here with reference to the light shielding plate 350 as an example.

Figure 8:
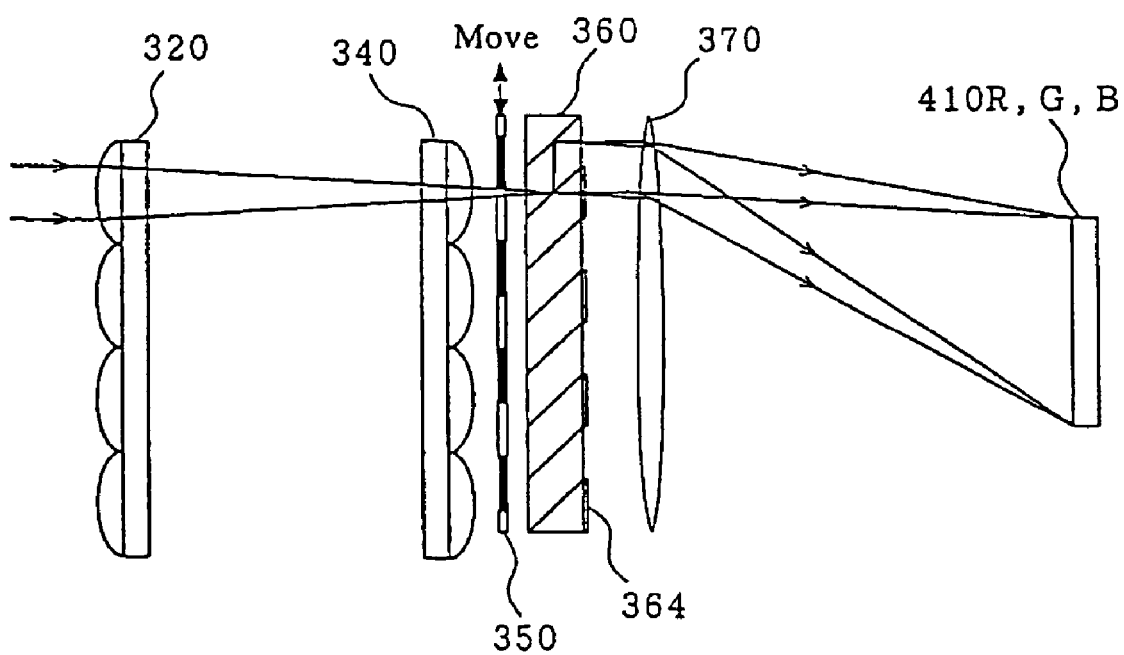
FIG. 8 is a schematic view showing an action of an illumination optical system according to the embodiment of the invention.
Figure 9:
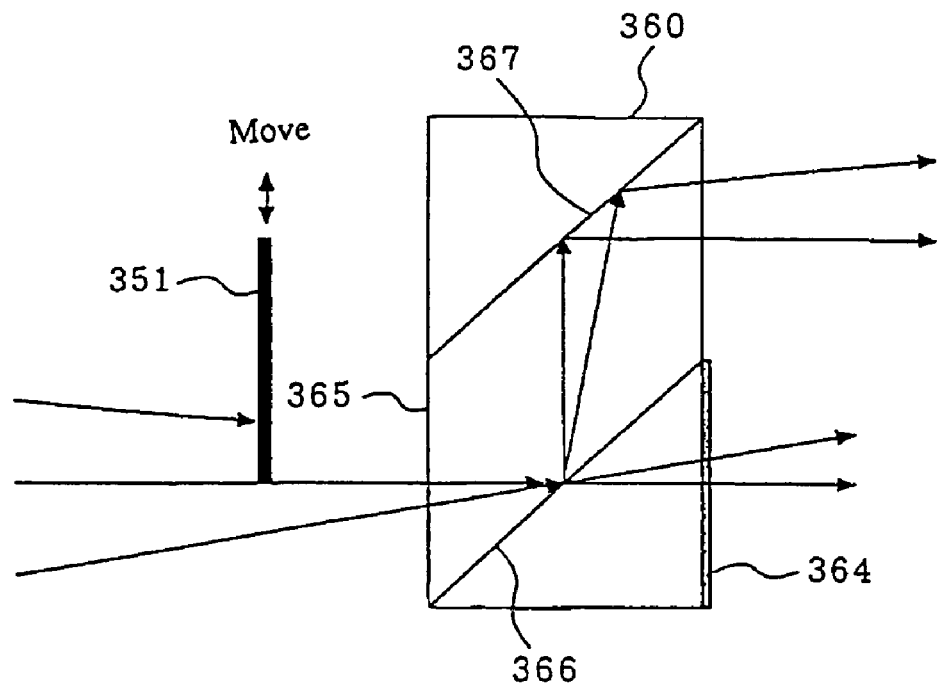
FIG. 9 is an enlarged view showing the vicinity of a site where the light shielding plate in the optical system in FIG. 8 is provided.

FIG. 8 is a schematic view showing an action of an illumination optical system incorporating a light shielding plate 350. FIG. 9 is an enlarged view showing the vicinity of the light shielding plate 350 in the optical system in FIG. 8. Here, blacked out portions in the light shielding plate 350 are the light shielding portions 351 and clear portions are apertures (reference numeral thereof is omitted). Part of light transmitted through the first lens array 320 and second lens array 340 is shielded by the light shielding portions 351 depending on the position of the light shielding plate 350 and the remaining light passes through the apertures and is made incident on the polarization splitting films 366 in the polarization conversion element array 360. It is noted that the subsequent light path is as described above.

Therefore, when the incident light on the polarization splitting films 366 is required as much as possible (i.e. when high brightness is required), the light shielding plate 350 is positioned so that the light shielding portions 351 are not superimposed on the light incident surfaces of light transmitting members corresponding to the polarization splitting films 366. On the other hand, in the case when a lower brightness is required, the light shielding plate 350 is moved in a direction in which the light shielding portions 351 are superimposed on the light incident surfaces of the polarization conversion elements corresponding to the polarization splitting films 366 until appropriate brightness is obtained.

The light shielding plates 350, 430 having such actions can be formed by a metal plate provided with apertures as the light transmitting portions or a light transmissive plate on which reflective films are formed as the light shielding portions by a vapor-deposition.

Figure 10:
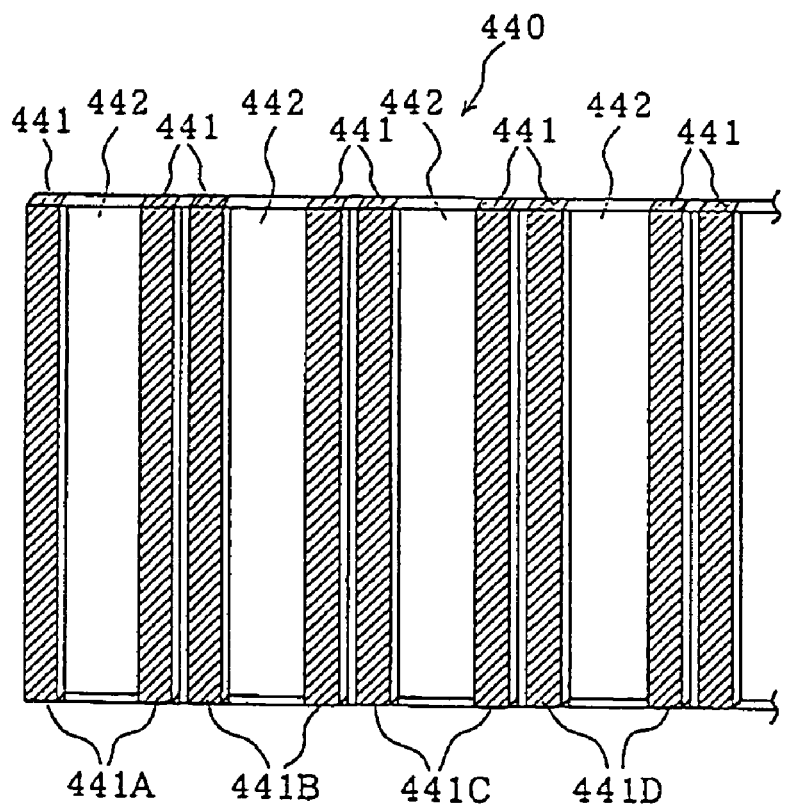
FIG. 10 is a schematic perspective view showing an example of a variable diaphragm for adjusting the quantity of incident light on polarization splitting films.
Figure 11:
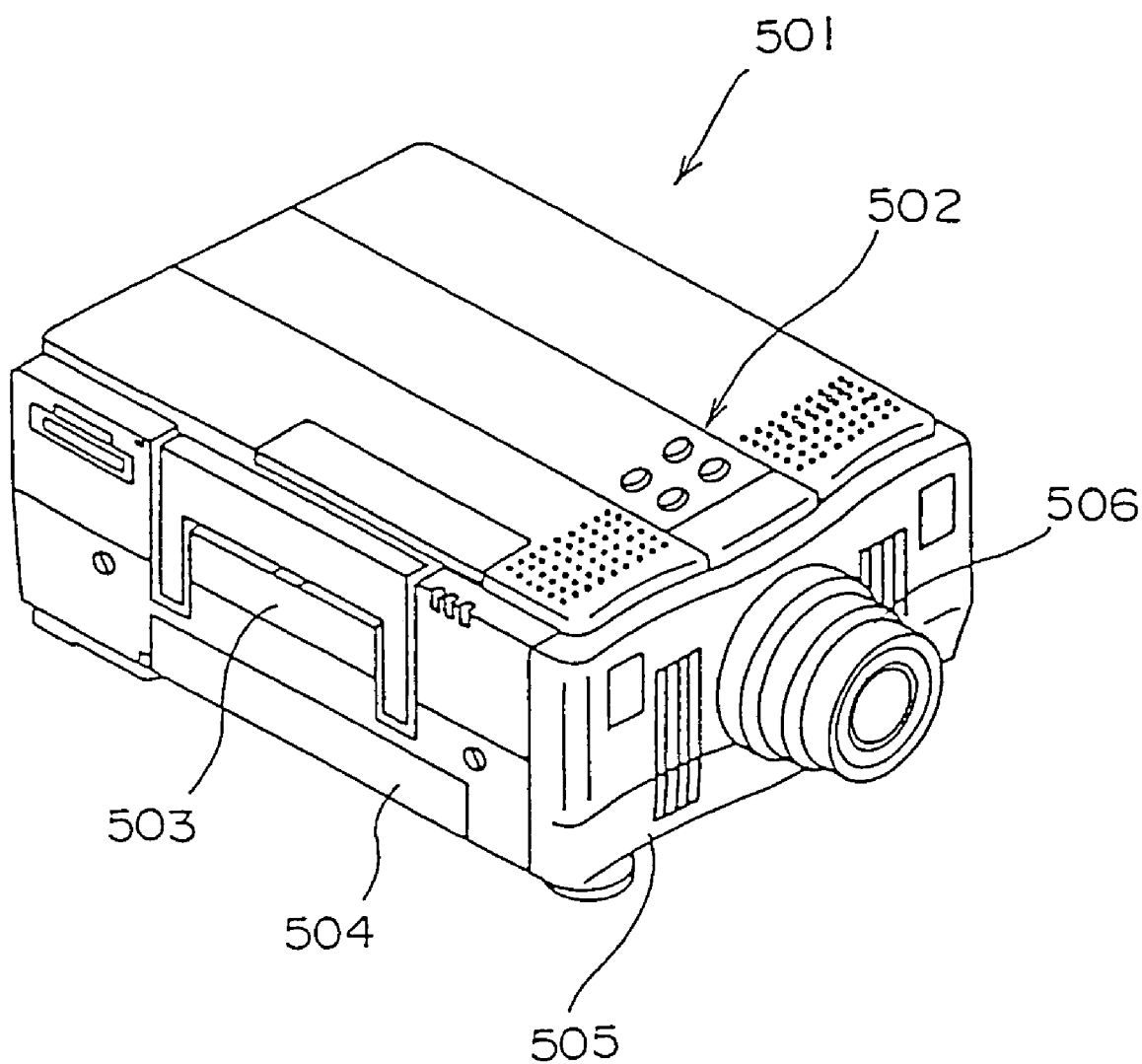
FIG. 11 is a perspective view showing the appearance of a common projector.
Figure 12:
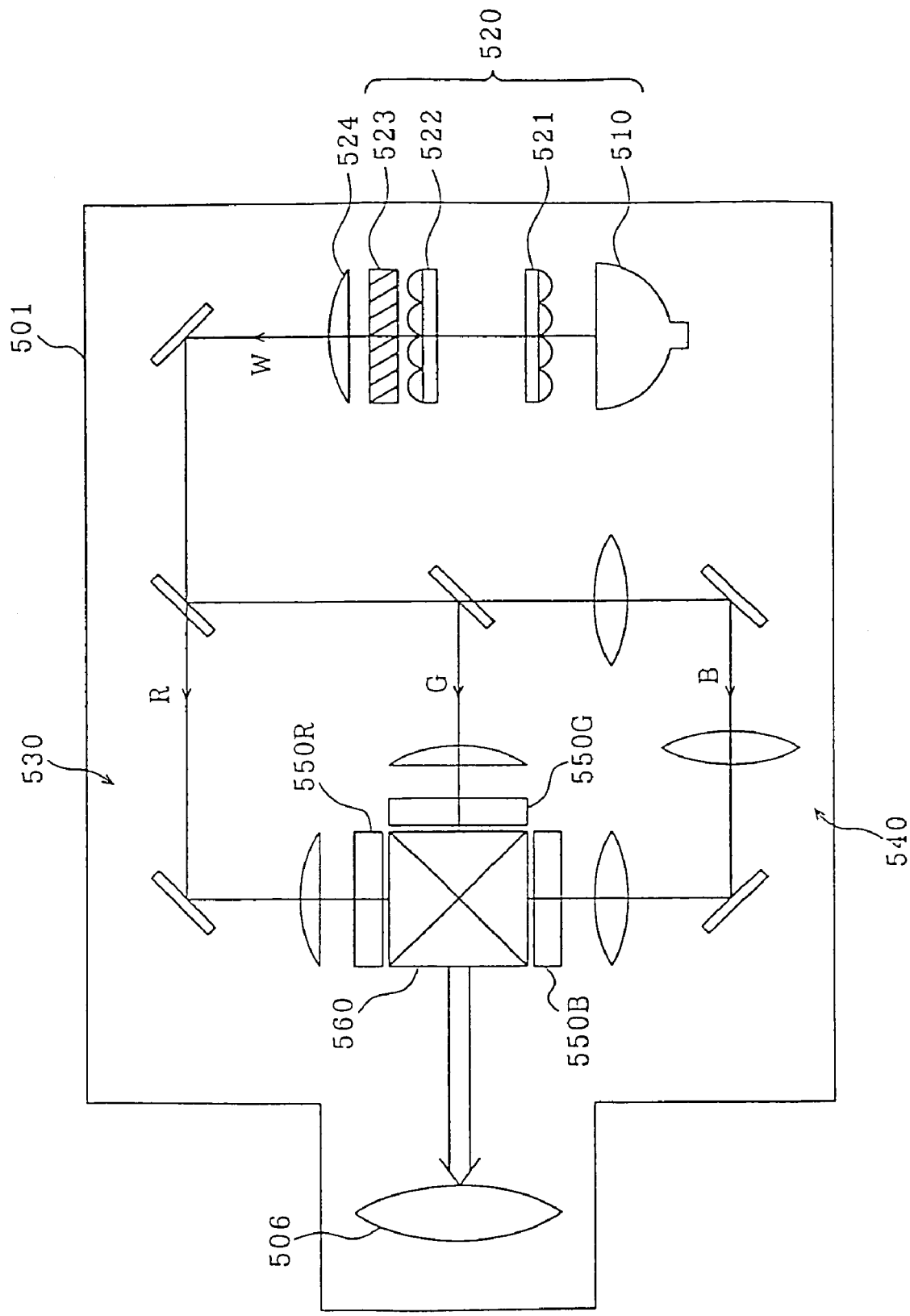
FIG. 12 is a block diagram showing a known optical system of the projector.
Figure 13:
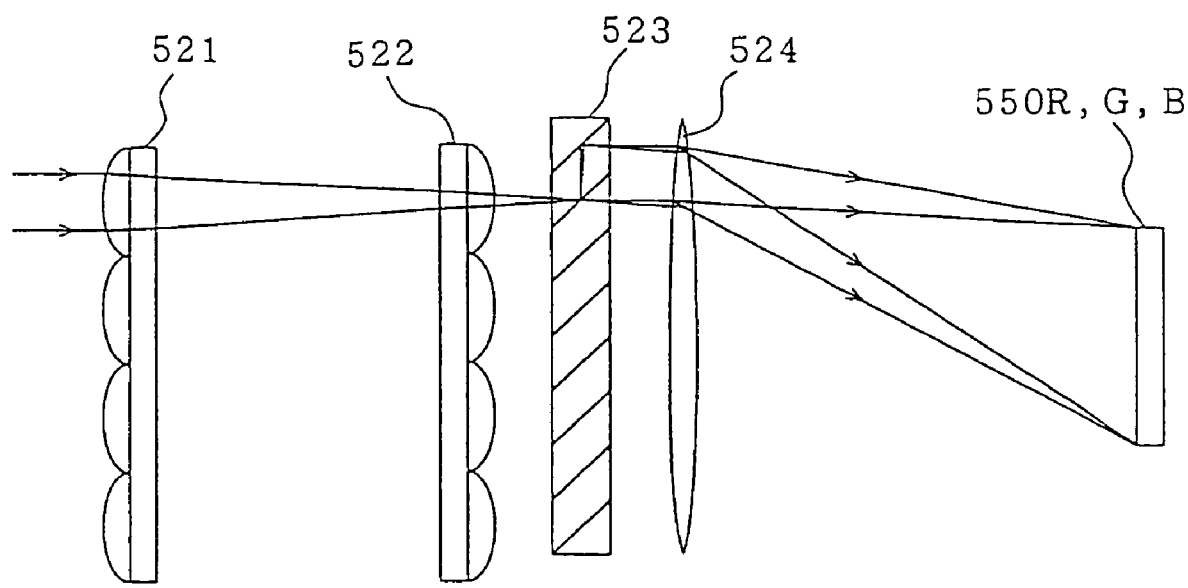
FIG. 13 is a schematic view showing an action of an illumination optical system constituting the optical system in FIG. 12.

A case where a quantity of light is adjusted by a light shielding plate 350 or 430 has been described above, but a variable diaphragm can also be used. For example, FIG. 10 is a schematic perspective view showing an example of a variable diaphragm for adjusting a quantity of incident light on the polarization splitting films 366 used to achieve the same object as that of the light shielding plates 350, 430. This variable diaphragm 440 is provided with variable diaphragms 441A–441D and so forth having pairs of left and right reflecting plates 441 for forming slit-like light transmitting portions 442 corresponding to the respective polarization conversion elements constituting the polarization conversion element array 360 and is constituted such that the slit width can be arbitrarily changed by an existing drive mechanism.

This variable diaphragm 440 is also disposed between the second lens array 340 and polarization conversion element array 360. Light is made incident only on the light incident surfaces corresponding to the polarization splitting films 366 out of light incident surfaces of the two polarization conversion element arrays 361, 362, normally with the respective variable diaphragms 441A–441D etc. fully opened so that the maximum brightness of the illumination optical system is obtained.

On the other hand, if brightness is too high in the above normal state, all or arbitrary variable diaphragms of these variable diaphragms 441A–441D etc. are narrowed down by reducing the slit width of the light transmitting portion 442 to appropriately adjust a quantity of incident light on the light incident surfaces of the polarization conversion elements corresponding to the polarization splitting films 366.

This variable diaphragm 440 may be used together with a light shielding plate which is fixedly disposed to make incident light only on the light incident surfaces corresponding to the polarization splitting films 366.

If the light shielding plates 350, 430 and variable diaphragms 440 (441A–441D etc.) are formed by metallic material such as aluminium having a high optical reflectance, excellent heat resistance can be obtained so that a long period use under high brightness becomes possible. Such metallic material preferably has a reflectance of 80% or more.

Operation of the projector constituted as above will be described below.

Non-polarized light emitted from the light source 200 shown in FIG. 2 is split into a plurality of sub-beams 202 by a plurality of small lenses 321 of the first lens array 320 constituting the integrator optical system 300 and converged to the vicinity of the polarization splitting films 366 of two polarization conversion element arrays 361, 362 by a plurality of small lenses 341 of the second lens array 340 while a quantity of light directed to the vicinity of the polarization splitting films 366 is adjusted by the position of the light shielding plate 350. Thus, a plurality of sub-beams made incident on the two polarization conversion element arrays 361, 362 are converted to one type of linearly polarized light and emitted as described above. Then, the plurality of sub-beams emitted from the two polarization conversion element arrays 361, 362 are superimposed on liquid crystal panels 410R, 410G, 410B described later by a superimposing lens 370.

The reflective mirror 372 shown in FIG. 1 is provided so as to guide the beams emitted from the superposing lens 370 in a direction towards a color beam splitting optical system 380. Therefore, this is not necessarily required depending on the construction of the optical system.

The color beam splitting optical system 380 is provided with first and second dichroic mirrors 382, 386 and has a function of splitting the light emitted from the illumination optical system into each light of three colors, red, green and blue. The first dichroic mirror 382 transmits a red light component out of the light emitted from the superposing lens 370 and reflects a blue and green component of light. The red light transmitted through the first dichroic mirror 382 is reflected by the reflective mirror 384 and reaches the liquid crystal panel 410R for red light through a field lens 400. This field lens 400 converts each sub-beams emitted from the superposing lens 370 to beams in parallel to a central axis (principal ray). The other field lenses 402, 404 provided in front of the liquid crystal panels 410G, 410B, respectively, also have the same action.

Furthermore, a green light out of the blue light and green light reflected by the first dichroic mirror 382 is reflected by the second dichroic mirror 386 and reaches the liquid crystal panel 410G for green light through the field lens 402. On the other hand, a blue light is transmitted through the second dichroic mirror 386, passes through a relay optical system 390 comprising an incident side lens 392, a reflective mirror 394, a relay lens 396 and a reflective mirror 398 and reaches the liquid crystal panel 410B for blue light further through the field lens 404. The relay optical system 390 is used for the blue light so as to prevent degradation of light use efficiency due to light diffusion or the like since the optical path length of the blue light is longer than that of other color light. That is, the sub-beams made incident on the incident side lens 392 are transferred to the field lens 404 without a change.

The three liquid crystal panels 410R, 410G, 410B have a function as an electro-optical device for modulating incident light according to given image information (image signals). Consequently, each color light made incident on the three liquid crystal panels 410R, 410G, 410B is modulated according to the image information to form an image of each color. It is noted that polarizers (not shown) are provided on the light incident side and light emitting side of the liquid crystal panels 410R, 410G, 410B.

Each color modulated light emitted from the three liquid crystal panels 410R, 410G, 410B is made incident on a cross dichroic prism 420. The cross dichroic prism 420 has a function as a color light synthesizing optical system for synthesizing the three modulated color lights to form a color image. In the cross dichroic prism 420, a dielectric multilayer film for reflecting the red light and a dielectric multilayer film for reflecting the blue light are formed in a substantially X shape at four rectangular prism interfaces. Each modulated color light is synthesized by these dielectric multilayer films to form a synthesized light for projecting a color image. The synthesized light generated by this cross dichroic prism 420 is emitted in the direction towards the projection lens 40. The projection lens 40 has a function of projecting this synthesized light on a projection screen to display a color image on the projection screen.

In the projector of this embodiment described above, when an image is projected on a large screen, a clear image is obtained with high brightness by adjusting the position of the light shielding plate 350, 430 or the slit width of the variable diaphragm 440. On the other hand, when the image is projected on a small screen, brightness can be reduced to make the image easy to see. Therefore, one projector can be used irrespective of the size of the screen.

Furthermore, since the polarization conversion element array 360 is in the vicinity of an arc image of the light source, the vicinity of the conversion element array 360 and the entrance pupil of the projection lens are conjugated. Therefore, even if the light shielding plate 350, 430 or variable diaphragm 440 is disposed in the vicinity thereof, illumination unevenness is not caused by the effect thereof.

Furthermore, since the quantity of the light entering the liquid crystal panels 410R, 410G, 410B are reduced as a whole by reducing brightness, light resistance of these liquid crystal panels is improved and thus the life thereof can be made longer.

In the above embodiment, an example where the present invention is applied to a projector using transmissive liquid crystal panels has been explained, but the present invention can be applied to a projector using reflective liquid crystal panels. As described later, the electro-optical device is not limited to a liquid crystal panel. Here, "transmissive" means that an electro-optical device such as a liquid crystal panel transmits light while "reflective" means that an electro-optical device such as a liquid crystal panel reflects light. In the projector employing reflective electro-optical devices, a dichroic prism may be utilized as color beam splitting means for splitting light into each light in three colors, red, green and blue as well as color beam synthesizing means for synthesizing the each modulated color light and emitting the synthesized light in the same direction.

The electro-optical device for modulating light is not limited to a liquid crystal panel, but may be a device using, for example, a micro mirror.

The prism, which is a color beam synthesizing optical system, is not limited to a dichroic prism having surfaces for selecting two types of colors formed along bonding surfaces of four triangular prisms, but may be a dichroic prism having one type of color selecting surface or a polarizing beam splitter. Or, a prism may be obtained by disposing a light selecting surface in a substantially hexahedron-shaped light transmissive box and filling fluid therein.

Furthermore, projectors include a front type for projecting an image from the viewing direction and a rear type for projecting an image from the direction opposite to the viewing direction. The construction shown in the above embodiment can be applied to either thereof.

According to the present invention, an illumination optical system and projector provided with the same can be obtained that can maintain higher brightness of optical equipment and adjust the brightness as required without degrading design freedom of other optical systems or causing uneven illumination.

What is claimed is:

1. An illumination optical system comprising:
a light source;
a beam splitting element including a plurality of lenses that splits light emitted from the light source into a plurality of sub-beams;
a polarization conversion element including
a polarization beam splitter array that splits each of the plurality of sub-beams into two types of polarized light, the polarization beam splitter array having a plurality of polarization splitting films and reflective films which are alternately arranged, and
a phase element disposed on the emitting surface side of the polarization beam splitter array to align the light polarization directions of the two types of polarized light; and
a light shielding member that adjusts a quantity of incident light on the polarization splitting films, the light shielding member being provided between the beam splitting element and the polarization beam splitter array;
wherein the light shielding member is disposed movably along a light incident surface of the polarization beam splitter array so as to vary a quantity of incident light on portions of the light incident surface corresponding to the polarization splitting films.

2. The illumination optical system according to claim 1, wherein the light shielding member is a light shielding plate comprising a plurality of light shielding portions and apertures corresponding to the polarization splitting films and reflective films.

3. The illumination optical system according to claim 1, wherein the light shielding member is constituted by a plurality of parallel light shielding plates to adjust the quantity of the incident light by moving any ones thereof.

4. The illumination optical system according to claim 1, wherein the light shielding member is constituted by a plurality of light shielding plates where one of the light shielding plates is fixedly positioned so as to allow the light to be made incident on portions of the light incident surface corresponding to the plurality of polarization splitting films, while the other light shielding plate is disposed in parallel with the fixedly positioned light shielding plate and is movable to adjust the quantity of incident light.

5. The illumination optical system according to claim 1, wherein the light shielding member is a variable diaphragm which arbitrarily reduces the quantity of the incident light on the polarization splitting films constituting the polarization conversion element.

6. The illumination optical system according to claim 5, wherein light transmitting portions of the variable diaphragm are formed as slits and the quantity of the incident light on the polarization splitting films is reduced by changing widths of the slits.

7. The illumination optical system according to claim 1, wherein the light shielding member is composed of metallic material having an optical reflectance of 80% or more.

8. A projector comprising:
an illumination optical system for emitting light; and
an electro-optical device that modulates the light emitted by the illumination optical systems;
said illumination optical system is comprised of:
a light source;
a beam splitting element including a plurality of lenses that splits light emitted from the light source into a plurality of sub-beams;
a polarization conversion element including:
a polarization beam splitter array that splits each of the plurality of sub-beams into two types of polarized light, the polarization beam splitter array having a plurality of polarization splitting films and reflective films which are alternately arranged, and
a phase element disposed on the emitting surface side of the polarization beam splitter array to align the light polarization directions of the two types of polarized light; and
a light shielding member that adjusts a quantity of incident light on the polarization splitting films, the light shielding member being provided between the beam splitting element and the polarization beam splitter array;
wherein the light shielding member is disposed movably along a light incident surface of the polarization beam splitter array so as to vary a quantity of incident light on portions of the light incident surface corresponding to the polarization splitting films.

9. The projector according to claim 8 further comprising:
a color beam splitting optical system for splitting the light emitted by the illumination optical system into beams of three colors;
a plurality of the electro-optical devices for modulating each of the color beams split by the color beam splitting optical system;
a color beam synthesizing optical system for synthesizing modulated beams of each color; and
a projection lens for projecting the synthesized beams.

10. The projector according to claim 8, wherein the light shielding member is a light shielding plate comprising a plurality of light shielding portions and apertures corresponding to the polarization splitting films and reflective films.

11. The projector according to claim 8, wherein the light shielding member is constituted by a plurality of parallel light shielding plates to adjust the quantity of the incident light by moving any ones thereof.

12. The projector according to claim 8, wherein the light shielding member is constituted by a plurality of light shielding plates where one of the light shielding plate is fixedly positioned so as to allow light to be made incident on portions of the light incident surface corresponding to the plurality of polarization splitting films, while the other light shielding plate is disposed in parallel with the fixedly positioned light shielding plate and is movable to adjust the quantity of incident light.

13. The projector according to claim 8, wherein the light shielding member is a variable diaphragm which arbitrarily reduces the quantity of the incident light on the polarization splitting films constituting the polarization conversion element.

14. The projector according to claim 13, wherein light transmitting portions of the variable diaphragm are formed as slits and the quantity of the incident light on the polarization splitting films are reduced by changing widths of the slits.

15. The projector according to claim 8, wherein the light shielding member is composed of metallic material having an optical reflectance of 80% or more.

* * * * *